(12) United States Patent
Kim (10) Patent No.: US 8,736,974 B2
(45) Date of Patent: May 27, 2014

(54) ZOOM LENS SYSTEM (75) Inventor: Ji-sung Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 78 days.

(21) Appl. No.: 13/459,868

(22) Filed: Apr. 30, 2012

(65) Prior Publication Data

US 2012/0314297 A1   Dec. 13, 2012

(30) Foreign Application Priority Data

Jun. 7, 2011   (KR) .................. 10-2011-0054645

(51) Int. Cl.
*G02B 15/14*   (2006.01)

(52) U.S. Cl.
USPC .......................................... 359/691; 359/683

(58) Field of Classification Search
USPC .................................................. 359/691, 683
See application file for complete search history.

(56) References Cited

U.S. PATENT DOCUMENTS

| | | | |
|---|---|---|---|
| 6,917,477 B2 | 7/2005 | Takatsuki | |
| 7,177,096 B2 | 2/2007 | Enomoto | |
| 7,251,080 B2 * | 7/2007 | Enomoto | ...................... 359/676 |
| 7,362,509 B2 | 4/2008 | Takeuchi | |
| 8,014,077 B2 | 9/2011 | Ohno | |
| 2010/0039710 A1 | 2/2010 | Wei | |

FOREIGN PATENT DOCUMENTS

| | | |
|---|---|---|
| JP | 2008-112000 A | 5/2008 |
| JP | 2010170114 A | 8/2010 |
| KR | 10-1998-0021812 A | 6/1998 |
| KR | 10-2006-0047460 A | 5/2006 |
| KR | 10-2006-0052098 A | 5/2006 |
| KR | 10-2010-0020907 A | 2/2010 |

OTHER PUBLICATIONS

Communication dated Jun. 21, 2013 issued by the Korean Intellectual Property Office in counterpart Korean Application 10-2011-0054645.

* cited by examiner

*Primary Examiner* — William Choi
(74) *Attorney, Agent, or Firm* — Sughrue Mion, PLLC

(57) ABSTRACT

A zoom lens system including, in an order from an object to an image: a first lens group having negative refractive power; and a second lens group having positive refractive power, wherein the zoom lens system satisfies equations: i) $1.2 \leq F_{now} \leq 2.2$; ii) $2.5 < f_t/f_w \leq 3$; and iii) $BFL \geq 6$ mm, where $F_{now}$ denotes an F-number at a wide angle position, $f_t$ and $f_w$ respectively denotes overall focal lengths at a telephoto position and the wide angle position, and BFL denotes a back focal length.

18 Claims, 12 Drawing Sheets

ZOOM LENS SYSTEM

CROSS-REFERENCE TO RELATED PATENT APPLICATION

This application claims priority from Korean Patent Application No. 10-2011-0054645, filed on Jun. 7, 2011, in the Korean Intellectual Property Office, the disclosure of which is incorporated herein by reference in its entirety.

BACKGROUND

1. Field

Apparatuses consistent with exemplary embodiments relate to a zoom lens system.

2. Description of the Related Art

An electronic imaging apparatus that realizes an image by using a charge coupled device (CCD) or a complementary metal-oxide semiconductor (CMOS), such as a digital still camera, a video camera, a surveillance camera, or a camera for a mobile phone, often uses a zoom lens for convenience, and it is required that such a zoom lens be miniaturized.

Such miniaturized zoom lenses have been continuously developed, and since high pixel images become possible through development of electronic image pickup devices and digital storage apparatuses, demand for lenses for obtaining mega pixel images is increasing. Specifically, a zoom lens for a surveillance camera, such as a closed circuit television (CCTV), is to have characteristics of a wide angle large aperture lens so as to monitor a dark place over a wide range, and is required to satisfactorily compensate for optical aberration around a subject so as to allow checking of even information pertaining to small characteristics of the subject.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more embodiments provide a bright zoom lens system having a wide view angle.

According to an aspect of an exemplary embodiment, there is provided a zoom lens system including, in an order from an object to an image: a first lens group having negative refractive power; and a second lens group having positive refractive power, wherein the zoom lens system satisfies conditions below:

$1.2 \leq F_{now} \leq 2.2$;

$2.5 < f_t/f_w \leq 3$; and $BFL \geq 6$ mm, wherein $F_{now}$ denotes an F-number at a wide angle position, $f_t$ and $f_w$ respectively denotes overall focal lengths at a telephoto position and the wide angle position, and BFL denotes a back focal length.

The first lens group and the second lens group may move such that an interval between the first lens group and the second lens group changes while zooming from the wide angle position to the telephoto position.

The first lens group may move to the image and the second lens group may move to the object while zooming from the wide angle position to the telephoto position.

An iris may be disposed between the first lens group and the second lens group, and the iris may be fixed and does not move during zooming.

The zoom lens system may satisfy a condition $-3.0 < f_t/f_w < -2.5$, wherein $f_t$ denotes a focal length of the first lens group and $f_w$ denotes the overall focal length at the wide angle position.

The first lens group may include, in an order from the object to the image: a first lens having negative refractive power; a second lens having negative refractive power; and a third lens having positive refractive power.

The second lens group may include, in an order from the object to the image: a fourth lens having positive refractive power; a fifth lens having negative refractive power; and a sixth lens having positive refractive power.

An Abbe number vd22 of the second lens from the object in the second lens group may satisfy a following condition vd22<30.

A d-line refractive index nd21 of the first lens from the object in the second lens group may satisfy a following condition nd21>1.58.

The zoom lens system may satisfy a following condition v(G2+)>50, wherein v(G2+) is an average of Abbe numbers of lenses having positive refractive power in the second lens group.

The second lens group may include at least one aspheric surface.

A lens surface of the second lens group closest to the image may be an aspheric surface. Alternatively, a lens surface of the second lens group closest to the object may be an aspheric surface.

According to another aspect of an exemplary embodiment, there is provided an imaging apparatus including: the zoom lens system; and an image pickup device for converting an optical image formed by the zoom lens system to an electric signal.

BRIEF DESCRIPTION OF THE DRAWINGS

The above and other aspects will become more apparent by describing in detail exemplary embodiments thereof with reference to the attached drawings, in which.

DETAILED DESCRIPTION

Hereinafter, exemplary embodiments will be described in detail with reference to the attached drawings. In the drawings, the sizes of elements may be exaggerated for clarity.

Figure 1:
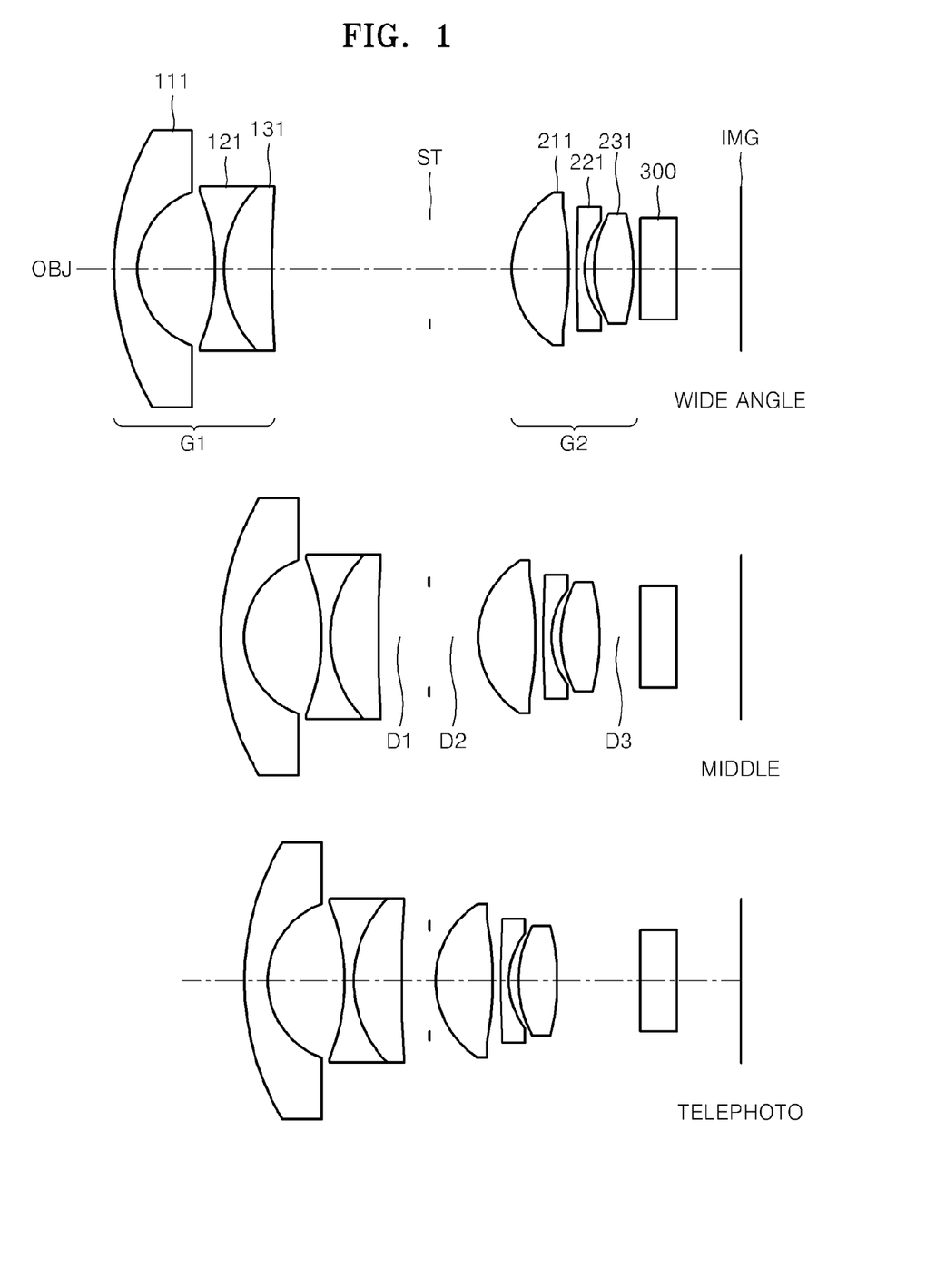
FIG. 1 is diagrams of optical arrangements of a zoom lens respectively at a wide angle position, a middle position, and a telephoto position, according to an exemplary embodiment.
Figure 3:
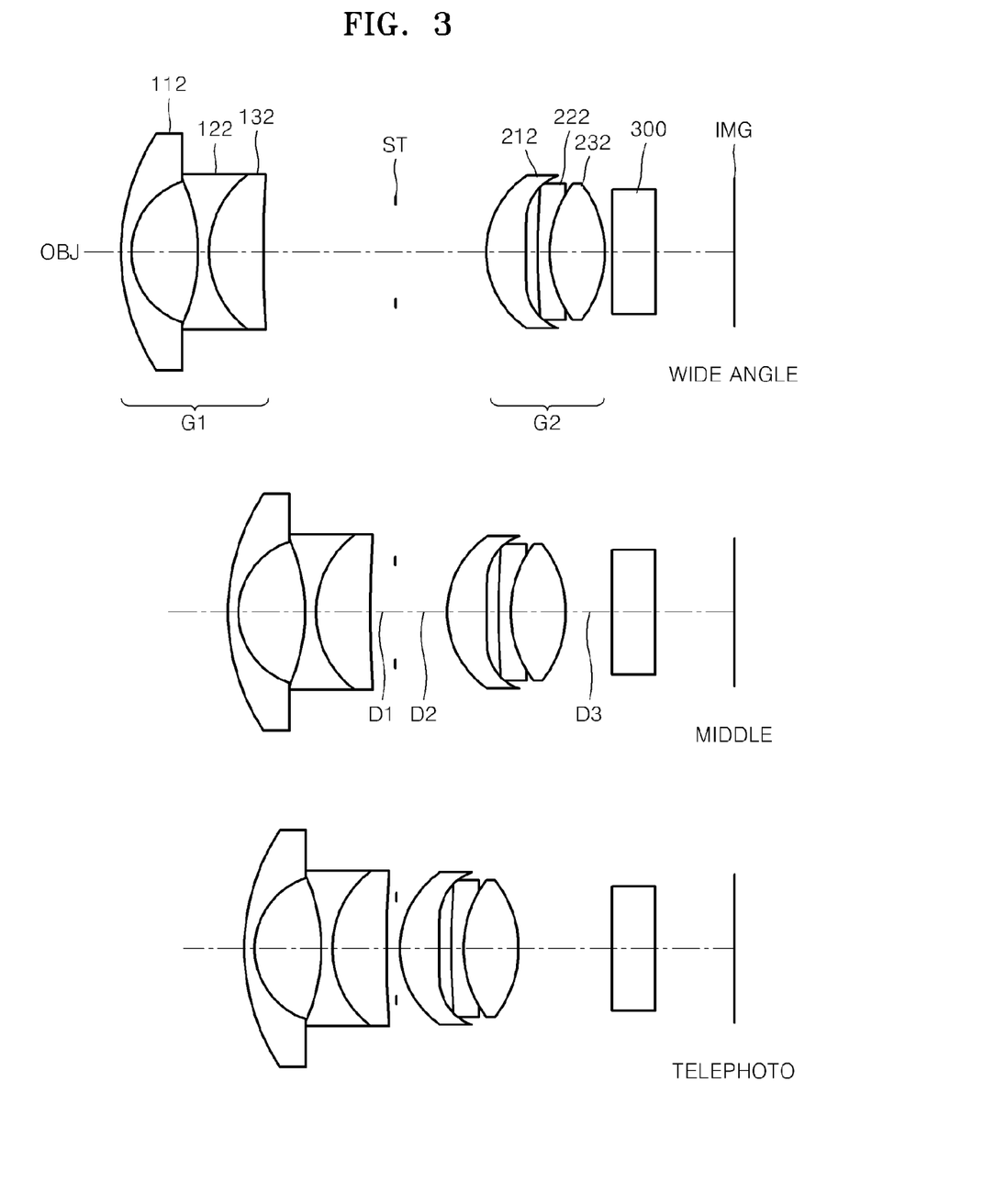
FIG. 3 is diagrams of optical arrangements of a zoom lens respectively at a wide angle position, a middle position, and a telephoto position, according to another exemplary embodiment.
Figure 5:
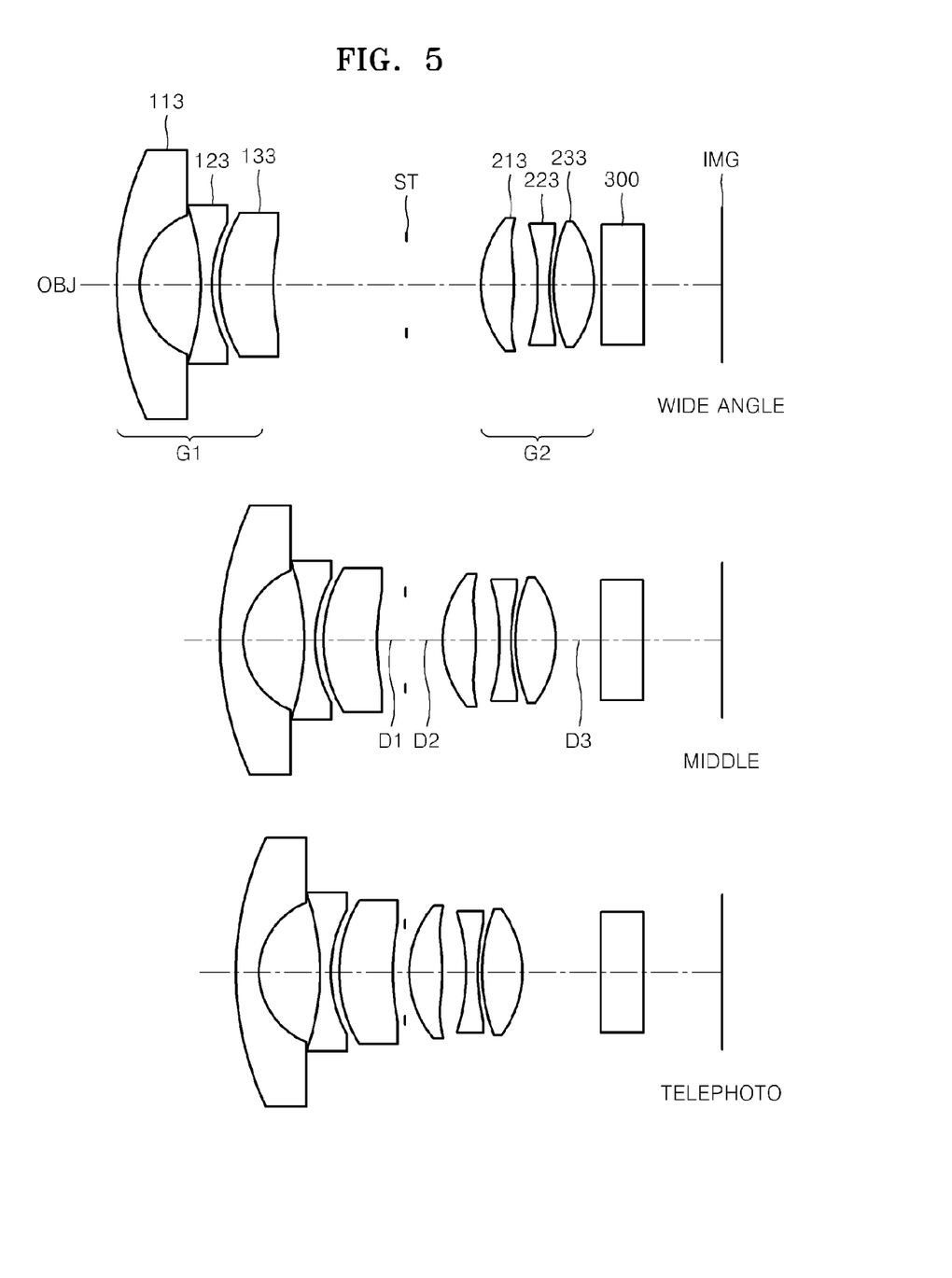
FIG. 5 is diagrams of optical arrangements of a zoom lens respectively at a wide angle position, a middle position, and a telephoto position, according to another exemplary embodiment.
Figure 6A:
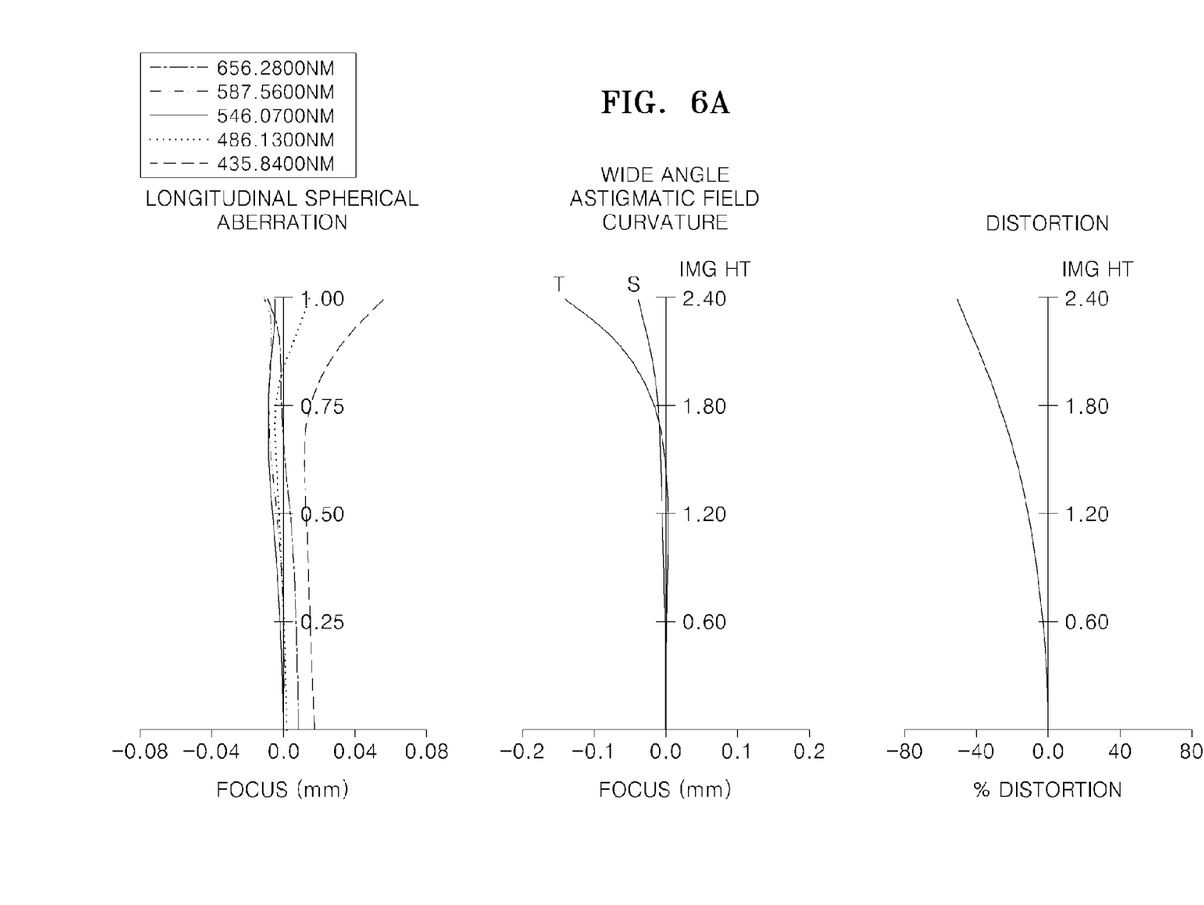
FIGS. 6A-6C illustrate longitudinal spherical aberration, astigmatic field curvature, and distortion aberration respectively at the wide angle position, the middle position, and the telephoto position of the zoom lens of FIG. 5.
Figure 6B:
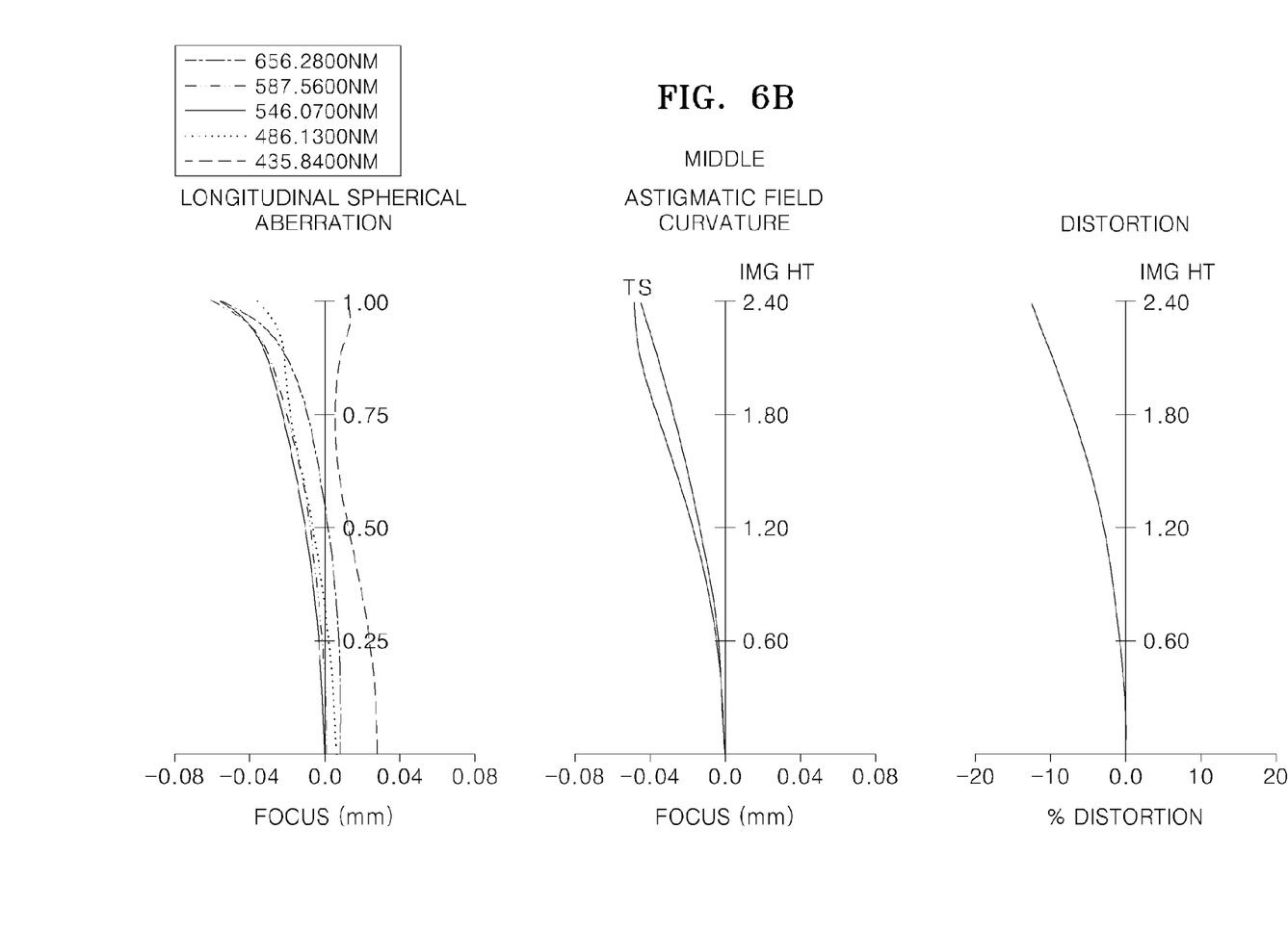
Figure 6C:
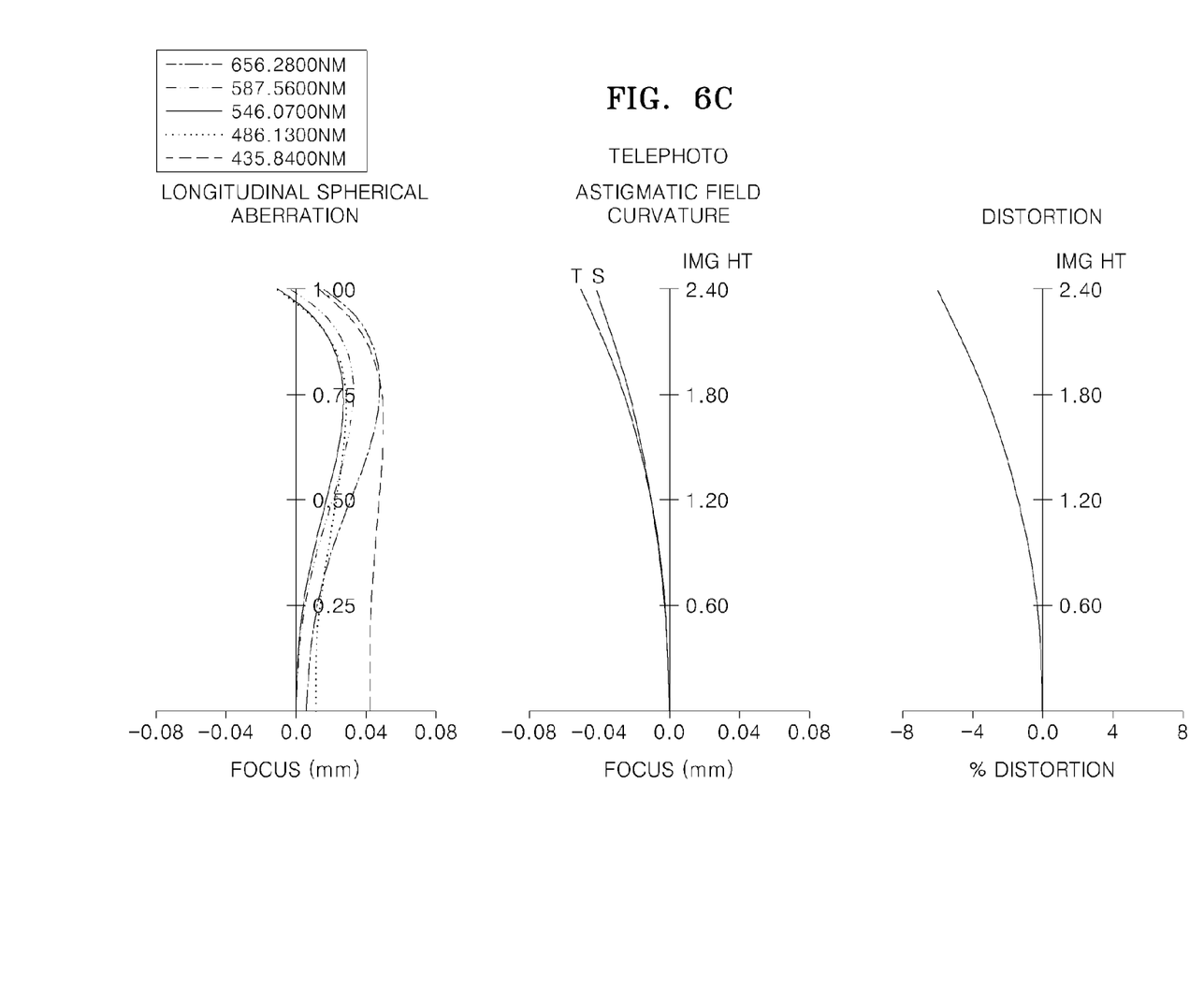

FIGS. 1, 3, and 5 are diagrams of optical arrangements of zoom lenses respectively at a wide angle position, a middle position, and a telephoto position, according to exemplary embodiments.

FIGS. 1, 3, and 5 each illustrates a zoom lens system that includes, in an order from an object OBJ to an image IMG, a first lens group G1 having negative refractive power and a second lens group G2 having positive refractive power.

Lenses of the first and second lens groups G1 and G2 are designed in such a way that the zoom lens system satisfies following conditions.

[Equation 1]

$$1.2 \leq F_{now} \leq 2.2 \quad (1)$$

[Equation 2]

$$2.5 < f_t/f_w \leq 3 \quad (2)$$

[Equation 3]

$$BFL \geq 6 \text{ mm} \quad (3)$$

Here, $F_{now}$ denotes an F-number at the wide angle position, $f_t$ and $f_w$ denote overall focal lengths respectively at the telephoto position and the wide angle position, and BFL denotes a back focal length.

The first and second lens groups G1 and G2 move in such a way that an interval between the first lens group G1 and the second lens group G2 changes during zooming from the wide angle position to the telephoto position, for example, the first lens group G1 may move toward the image IMG and the second lens group G2 may move toward the object OBJ.

An iris ST is disposed between the first and second lens groups G1 and G2, and the iris ST may not move and be fixed during zooming.

The first lens group G1 may include, in an order from the object OBJ to the image IMG, three lenses respectively having negative refractive power, negative refractive power, and positive refractive power. According to such a refractive power arrangement, distortion aberration effectively decreases and coma aberration is compensated for.

Also, the second lens group G2 may include, in an order from the object OBJ to the image IMG, three lenses respectively having positive refractive power, negative refractive power, and positive refractive power.

The second lens group G2 may include at least one aspheric surface. For example, a lens surface of the second lens group G2 closest to the image IMG may be an aspheric surface, a lens surface of the second lens group G2 closest to the object OBJ may be an aspheric surface, or both the lens surface of the second lens group G2 closest to the image IMG and the lens surface of the second lens group G2 closest to the object OBJ may be aspheric surfaces. Higher resolution may be realized with a relatively low number of lenses by forming the lens surface of the second lens group G2 closest to the object OBJ as an aspheric surface, and astigmatism and astigmatic field curvature may be effectively compensated for by forming the lens surface of the second lens group G2 closest to the image IMG as an aspheric surface.

The zoom lens system may satisfy a following condition.

[Equation 4]

$$-3.0 < f_1/f_w < -2.5 \quad (4)$$

Here, $f_1$ denotes a focal length of the first lens group G1 and $f_w$ denotes the overall focal length at the wide angle position.

Such condition is related to a ratio of the focal length of the first lens group G1 to the overall focal length at the wide angle position. When $f1/f_w$ is equal to or above −2.5, magnification of the zoom lens system increases but resolution of the zoom lens system decreases due to high aberration of the first lens group G1. When $f_1/f_w$ is equal to or below −3.0, a view angle and the magnification of the zoom lens system decrease, and an overall length of the zoom lens system increases, and thus it is difficult to miniaturize the zoom lens system.

The zoom lens system may also satisfy a following condition.

[Equation 5]

$$vd22 < 30 \quad (5)$$

Here, vd22 denotes a d-line Abbe number of a lens disposed second closest to the object OBJ from among the second lens group G2.

The above condition is related to the d-line Abbe number of the lens disposed second closest to the object OBJ from among the second lens group G2. When vd22 is equal to or higher than 30, chromatic aberration increases.

The zoom lens system may also satisfy a following condition.

[Equation 6]

$$v(G2+) > 50 \quad (6)$$

Here, v(G2+) denotes an average of Abbe numbers of lenses having positive refractive power from among the second lens group G2.

The above condition is related to the average of the Abbe numbers of the lenses having positive refractive power from among the second lens group G2. When v(G2+) is equal to or smaller than 50, chromatic aberration increases.

The zoom lens system may also satisfy a following condition.

[Equation 7]

$$nd21 > 1.58 \quad (7)$$

Here, nd21 is a d-line refractive index of a lens closest to the object OBJ of the second lens group G2.

The above condition is related to the d-line refractive index of the lens closest to the object OBJ of the second lens group G2. When nd21 is equal to or smaller than 1.58, chromatic aberration is generated and spherical aberration increases. Also, condition (7) with condition (5) may minimize axial chromatic aberration.

Detailed lens data of various embodiments of the zoom lens system will now be described. An aspheric surface ASP according to exemplary embodiments may be defined as follows.

[Equation 8]

$$x = \frac{c'y^2}{1+\sqrt{1|(K+1)c'^2y^2}} + Ay^4 + By^6 + Cy^8 + Dy^{10} \quad (8)$$

Here, x denotes a distance from a vertex of a lens in an optical axis direction, y denotes a distance from a y-axis in a direction perpendicular to the optical axis direction, k denotes a conic constant, A, B, C, and D each denote an aspheric coefficient, and c' denotes a reciprocal (1/R) of a radius of curvature at the vertex of the lens.

Hereinafter, EFL denotes a focal length of the entire zoom lens system, Fno denotes an F-number, and FOV denotes a view angle. A * marked at a number of a surface denotes an aspheric surface. D1, D2, and D3 each denote a variable distance in each exemplary embodiment.

FIG. 1 is a diagram of a zoom lens system according to an exemplary embodiment. The zoom lens system includes, in an order from the object OBJ to the image IMG, the first lens group G1, the iris ST, and the second lens group G2. The first lens group G1 includes a first lens 111, a second lens 121, and a third lens 131, and the second lens group G2 includes a fourth lens 211, a fifth lens 221, and a sixth lens 231. The first lens 111, the second lens 121, and the fifth lens 221 are negative lenses, and the third lens 131, the fourth lens 211, and the sixth lens 231 are positive lenses. The second and third lenses 121 and 131 may be formed as a cemented lens. A reference numeral 300 denotes dummy glass and, for example, an infrared ray blocking filter or cover glass may be disposed here. The image IMG denotes an image surface of an image pickup device (not shown), such as a charge coupled device (CCD) or a complementary metal-oxide semiconductor (CMOS).

Figure 2A:
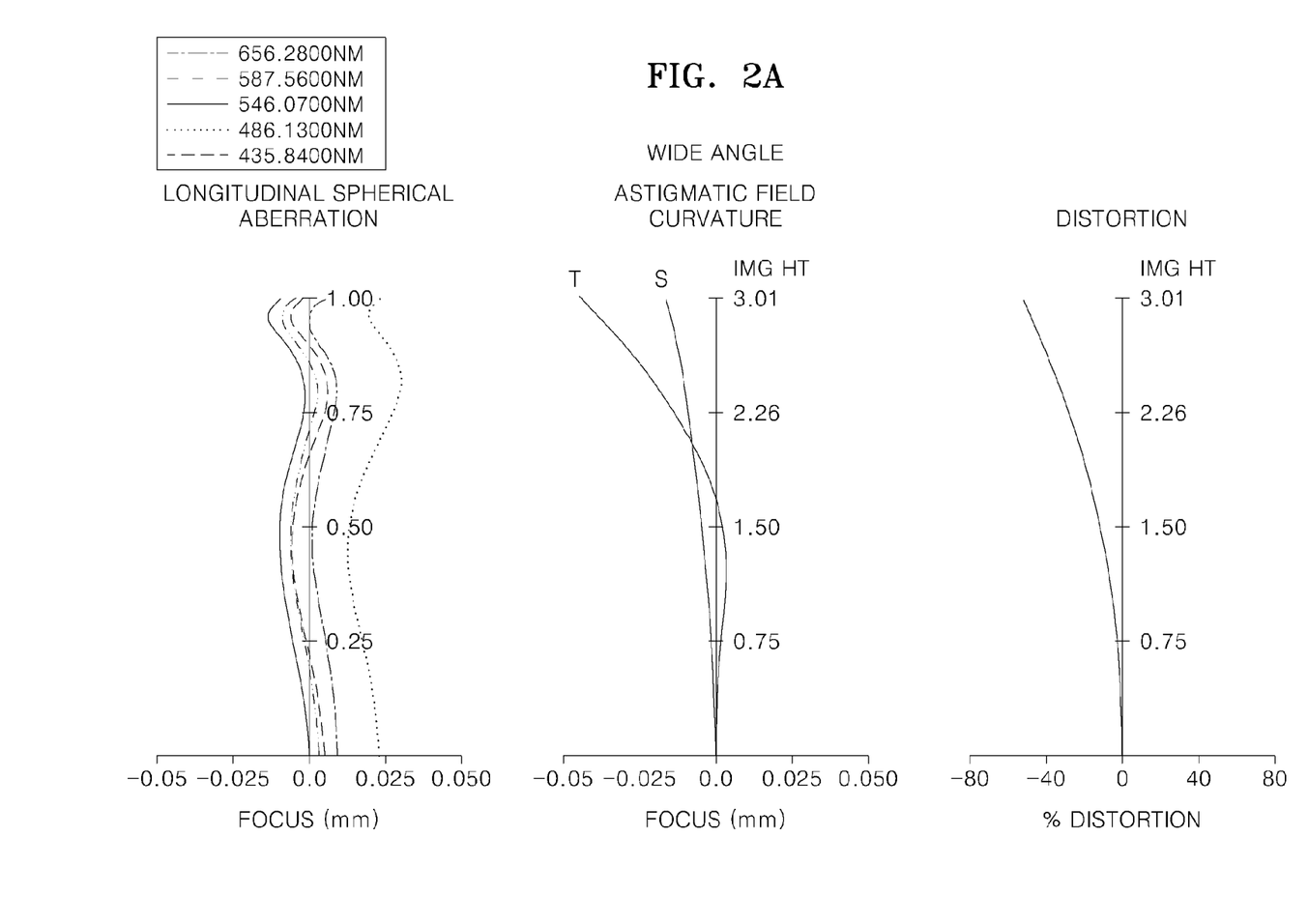
FIGS. 2A-2C illustrate longitudinal spherical aberration, astigmatic field curvature, and distortion aberration respectively at the wide angle position, the middle position, and the telephoto position of the zoom lens of FIG. 1.
Figure 2B:
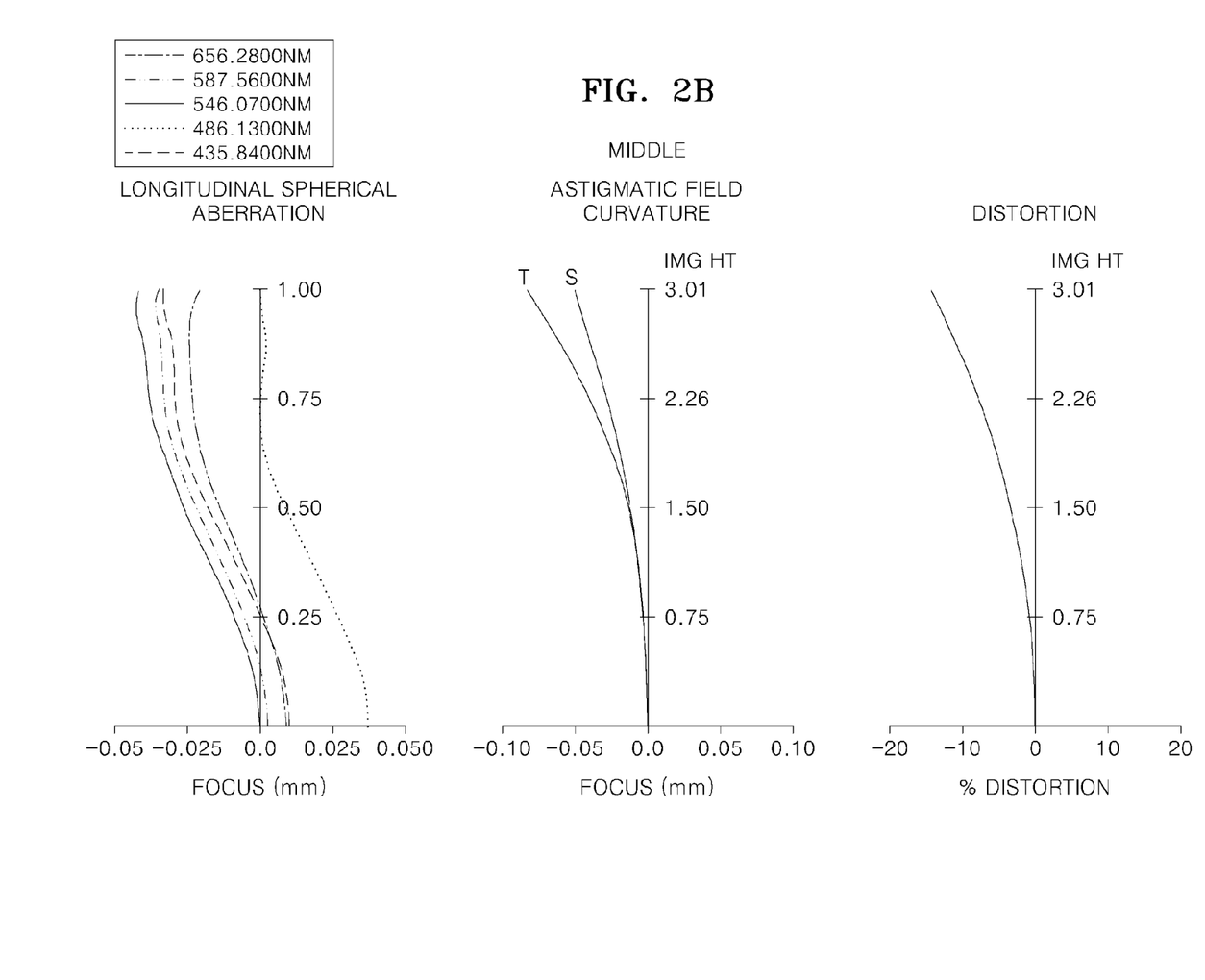
Figure 2C:
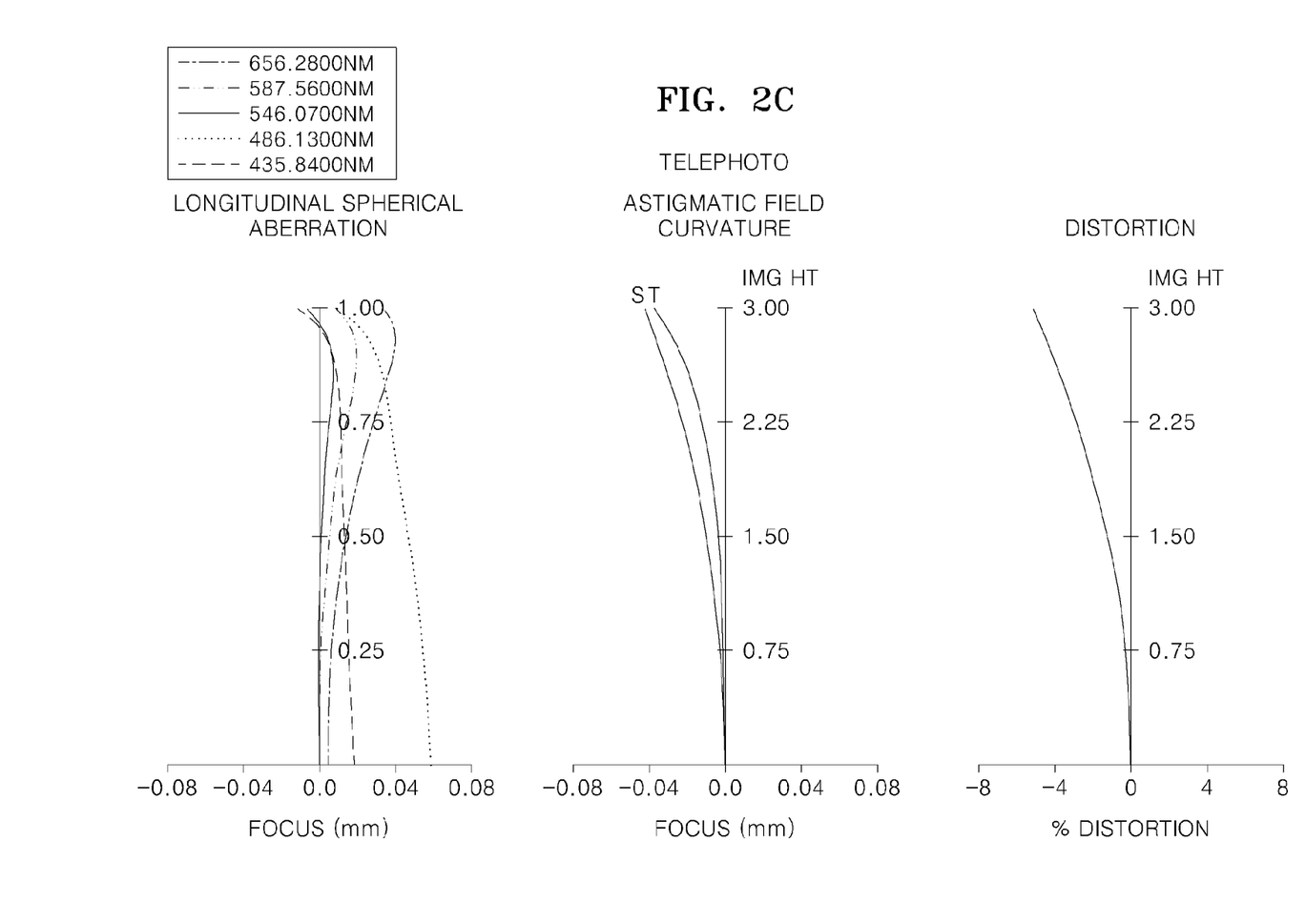

FIGS. 2A-2C illustrate longitudinal spherical aberration, astigmatic field curvature, and distortion aberration respectively at the wide angle position, middle position, and the telephoto position of the zoom lens of FIG. 1. The longitudinal spherical aberration are shown with respect to lights having wavelengths of 656.28 nm, 587.56 nm, 546.07 nm, 486.13 nm, and 435.84 nm, the astigmatic field curvature shows tangential field curvature and sagittal field curvature with respect to light having a wavelength of 546.07 nm, and the distortion aberration is shown with respect to light having a wavelength of 546.07 nm.

Tables 1 through 3 are lens data according to the current exemplary embodiment.

TABLE 1

| Surface | R (Radius of Curvature) | D (Distance or Thickness between Lenses) (mm) | Glass (Refractive Index, Abbe Number) |
|---|---|---|---|
| 1 | 21.415 | 1.7 | 835000.429 |
| 2 | 6.28 | 5.92 | |
| 3 | −16.497 | 0.73 | 610248.566 |
| 4 | 8.912 | 3.7 | 805184.254 |
| 5 | 74.79 | D1 | |
| 6 | Infinity | D2 | |
| 7* | 6.507 | 4.3 | 615160.630 |
| 8* | −15.71 | 0.6 | |
| 9 | 92.59 | 0.7 | 805184.254 |
| 10 | 6.282 | 0.7 | |
| 11* | 8.762 | 3 | 615160.630 |
| 12* | −15.578 | D3 | |
| 13 | Infinity | 2.75 | 516798.641 |
| 14 | Infinity | 5.006281 | |

TABLE 2

| Surface | A | B | C | K |
|---|---|---|---|---|
| 7 | −0.000202598236867 | −2.18923211048e−006 | −1.96632595214e−007 | 0.00E+00 |
| 8 | −0.000202598236867 | −4.45612286367e−005 | 7.0849791643e−007 | 0.00E+00 |
| 11 | 0.000875369899462 | −4.14144528227e−005 | −2.77971441114e−007 | −0.379688907104 |
| 12 | 0.000215233316027 | 2.26584221517e−006 | −6.9549988622e−007 | −1.27631479598 |

TABLE 3

| | EFL (mm) | FOV (degrees) | Fno | D1 (mm) | D2 (mm) | D3 (mm) |
|---|---|---|---|---|---|---|
| Wide Angle | 2.85 | 65.48 | 1.27 | 11.8352 | 6.3407 | 0.5 |
| Telephoto | 7.7 | 22.33 | 2.13 | 2.07 | 0.5 | 6.3407 |

FIG. 3 is a diagram of a zoom lens system according to another exemplary embodiment. The first lens group G1 includes a first lens 112, a second lens 122, and a third lens 132, and the second lens group G2 includes a fourth lens 212, a fifth lens 222, and a sixth lens 232. The first lens 112, the second lens 122, and the fifth lens 222 are negative lenses, and the third lens 132, the fourth lens 212, and the sixth lens 232 may be positive lenses. The second and third lenses 122 and 132 may be formed as a cemented lens, and the fifth and sixth lenses 222 and 232 may be formed as a cemented lens.

Figure 4A:
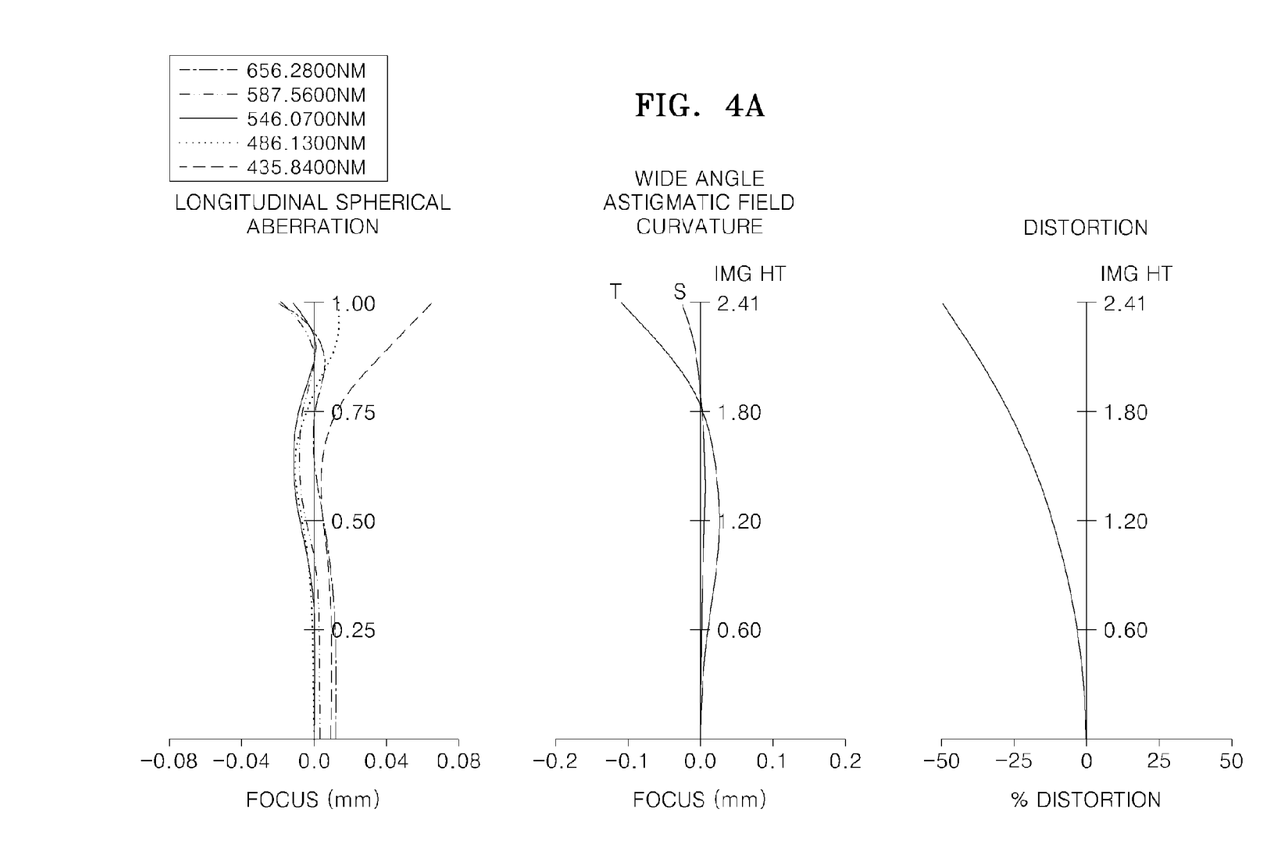
FIGS. 4A-4C illustrate longitudinal spherical aberration, astigmatic field curvature, and distortion aberration respectively at the wide angle position, the middle position, and the telephoto position of the zoom lens of FIG. 3.
Figure 4B:
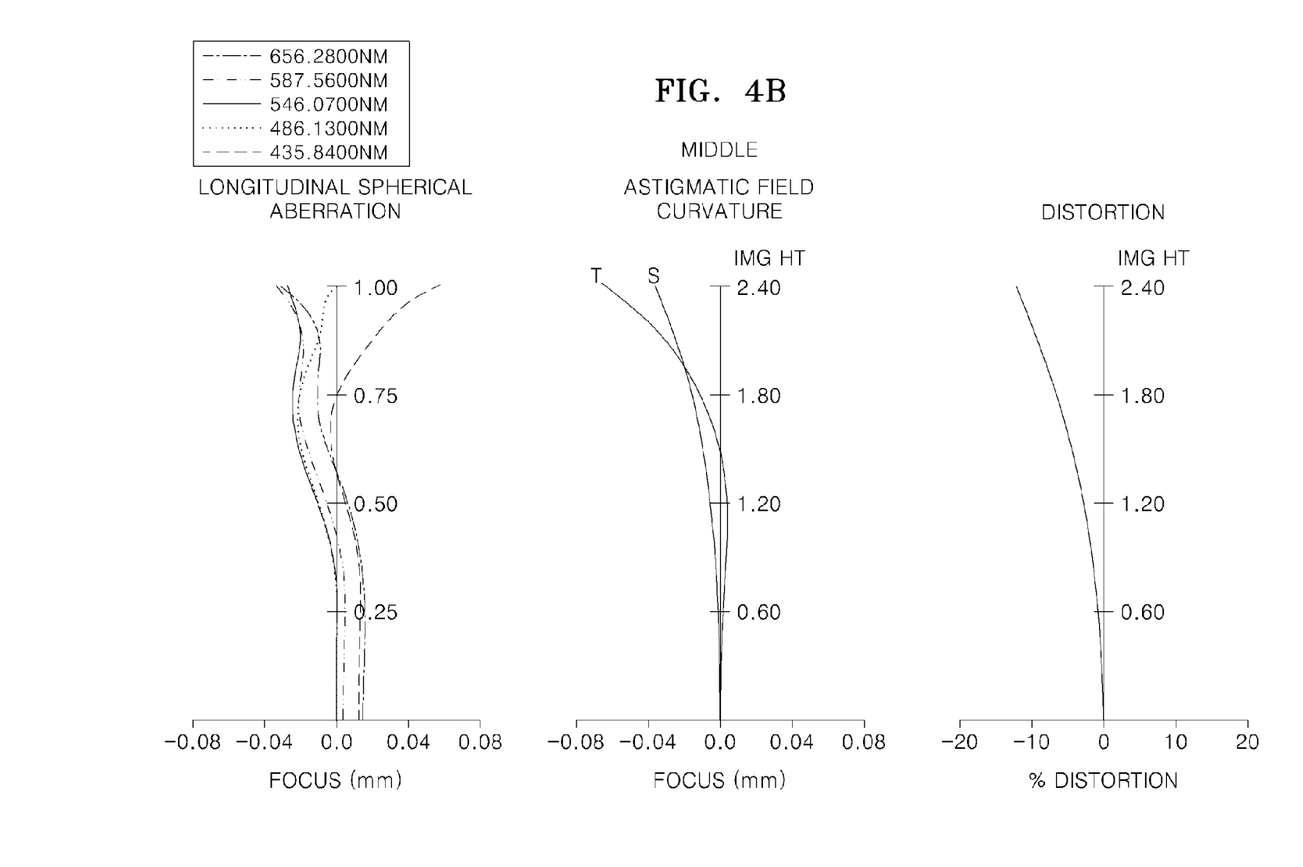
Figure 4C:
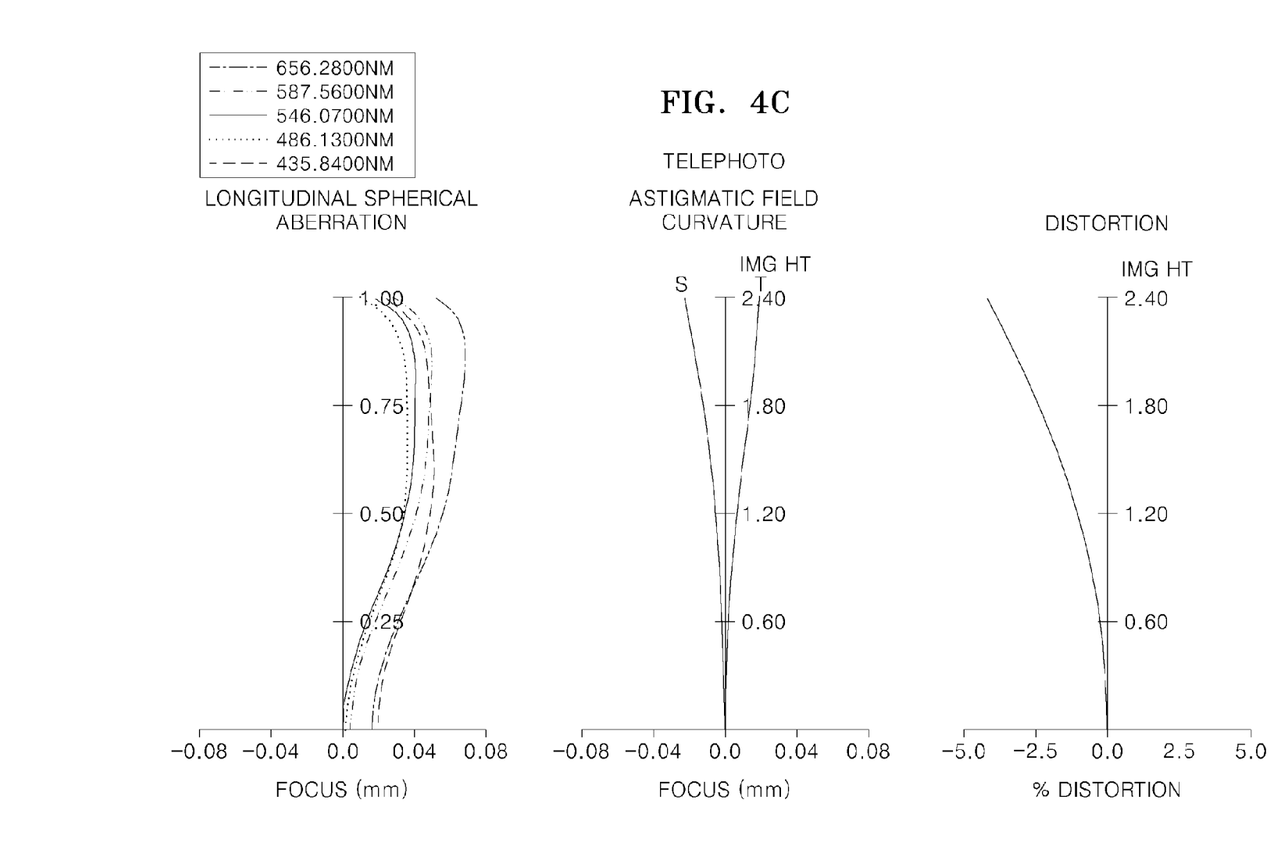

FIGS. 4A-4C illustrate longitudinal spherical aberration, astigmatic field curvature, and distortion aberration respectively at the wide angle position, middle position, and the telephoto position of the zoom lens of FIG. 3.

Tables 4 through 6 are lens data according to the current exemplary embodiment.

TABLE 4

| Surface | R (Radius of Curvature) | D (Distance or Thickness between Lenses) (mm) | Glass (Refractive Index, Abbe Number) |
|---|---|---|---|
| 1 | 13.57 | 0.7 | 804000.465 |
| 2 | 4.668 | 4.18 | |
| 3 | −12.318 | 0.7 | 608010.462 |
| 4 | 6.264 | 3.5 | 805184.254 |
| 5 | 48.134 | D1 | |
| 6 | infinity | D2 | |
| 7* | 6.863 | 2.55 | 615340.630 |
| 8* | −267.489 | 0.79 | |

TABLE 4-continued

| Surface | R (Radius of Curvature) | D (Distance or Thickness between Lenses) (mm) | Glass (Refractive Index, Abbe Number) |
|---|---|---|---|
| 9 | 74.68 | 0.7 | 805184.254 |
| 10 | 7.055 | 3.5 | 615340.630 |
| 11* | −7.06003 | D3 | |
| 12 | infinity | 2.75 | 516798.641 |
| 13 | infinity | 5.006281 | |

TABLE 5

| Surface | A | B | C | K |
|---|---|---|---|---|
| 7* | 0.0002980918780424 | 1.402191246915e−005 | 6.222144652229e−007 | 0.1251826462082 |
| 8* | 0.001854889024112 | 2.527652032471e−005 | 2.750913919344e−006 | 68.65083007041 |
| 11* | −0.0002007984353037 | −4.777344069079e−006 | −2.548830965281e−007 | −0.9879986832523 |

TABLE 6

| | EFL (mm) | FOV (degrees) | Fno | D1 (mm) | D2 (mm) | D3 (mm) |
|---|---|---|---|---|---|---|
| Wide Angle | 2.33 | 63.82 | 1.23 | 8.408 | 5.7223 | 0.5 |
| Telephoto | 6.7 | 20.46 | 2.13 | 0.5923 | 0.25 | 5.9723 |

FIG. 5 is a diagram of a zoom lens system according to another exemplary embodiment. The first lens group G1 includes a first lens 113, a second lens 123, and a third lens 133, and the second lens group G2 includes a fourth lens 213, a fifth lens 223, and a sixth lens 233. The first lens 113, the second lens 123, and the fifth lens 223 are negative lenses, and the third lens 133, the fourth lens 213, and the sixth lens 233 may be positive lenses.

FIGS. 5A-5C illustrate longitudinal spherical aberration, astigmatic field curvature, and distortion aberration respectively at the wide angle position, middle position, and the telephoto position of the zoom lens of FIG. 4.

Tables 7 through 9 are lens data according to the current exemplary embodiment.

TABLE 7

| Surface | R (Radius of Curvature) | D (Distance or Thickness between Lenses) (mm) | Glass (Refractive Index, Abbe Number) |
|---|---|---|---|
| 1 | 21.3374 | 1.5 | 617998.633 |
| 2 | 4.967 | 3.914 | |
| 3 | −15.3479 | 0.7 | 617998.633 |
| 4 | 8.4259 | 0.5 | |
| 5 | 8.8875 | 3.5 | 805184.254 |
| 6 | 27.1936 | D1 | |
| 7 | infinity | D2 | |
| 8* | 6.9789 | 2.1126 | 615340.63 |
| 9* | −53.627 | 1.5651 | |
| 10 | −12.3329 | 0.7 | 805184.254 |
| 11 | 15.2828 | 0.25 | |
| 12* | 6.9488 | 2.6353 | 615340.63 |
| 13* | −6.4624 | D3 | |
| 14 | infinity | 2.75 | 516798.641 |
| 15 | infinity | 5.006281 | |

TABLE 8

| # | A | B | C | k |
|---|---|---|---|---|
| 8 | −0.000388311 | 3.07E−06 | 1.12E−06 | 0 |
| 9 | −0.00072229 | 5.91E−05 | 7.92E−07 | 0 |
| 12 | −0.001592056 | 4.84E−05 | −7.15E−07 | −2.608226812 |
| 13 | 0.000434048 | −4.68E−06 | 7.25E−07 | 0.437465354 |

TABLE 9

| | EFL (mm) | FOV (degrees) | Fno | D1 (mm) | D2 (mm) | D3 (mm) |
|---|---|---|---|---|---|---|
| Wide Angle | 2.33 | 65.0166 | 1.31 | 8.5553 | 4.8177 | 0.25 |
| Telephoto | 6 | 23.002 | 2.0499 | 0.7966 | 0.25 | 4.8177 |

In the above embodiments, a bright zoom lens system having a wide view angle is realized via the above-described lens structures. Also, the zoom lens system realizes satisfactory optical performances, such as various aberration compensations, with a relatively low number of lenses.

The zoom lens system according to the exemplary embodiments described above may be used in an image apparatus, along with an image pickup device that changes an optical image formed by the zoom lens system to an electric signal. Such an imaging apparatus can detect motion of an object in a dark and wide area according to a wide view angle of the bright zoom lens system, and thus may be applied to a surveillance camera.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed is:

1. A zoom lens system comprising, in an order from an object to an image:
   a first lens group having negative refractive power; and
   a second lens group having positive refractive power,
   wherein the zoom lens system satisfies conditions below:

$$1.2 \leq F_{now} \leq 2.2;$$

$$2.5 < f_t/f_w \leq 3; \text{ and}$$

$$BFL \geq 6 \text{ mm},$$

wherein $F_{now}$ denotes an F-number at a wide angle position, $f_t$ and $f_w$ respectively denotes overall focal lengths at a telephoto position and a wide angle position, and BFL denotes a back focal length,
   wherein the condition $-3.0 < f_1/f_w < -2.5$ is satisfied, and wherein $f_t$ denotes a focal length of the first lens group and $f_w$ denotes the overall focal length at the wide angle position.

2. The zoom lens system of claim 1, wherein the first lens group and the second lens group move such that an interval between the first lens group and the second lens group changes while zooming from the wide angle position to the telephoto position.

3. The zoom lens system of claim 2, wherein the first lens group moves toward the image and the second lens group moves toward the object while the zooming from the wide angle position to the telephoto position.

4. The zoom lens system of claim 1, wherein an iris is disposed between the first lens group and the second lens group, and the iris is fixed and does not move during zooming.

5. The zoom lens system of claim 1, wherein the first lens group comprises, in an order from the object to the image:
a first lens having negative refractive power;
a second lens having negative refractive power; and
a third lens having positive refractive power.

6. The zoom lens system of claim 5, wherein the second lens group comprises, in an order from the object to the image:
a fourth lens having positive refractive power;
a fifth lens having negative refractive power; and
a sixth lens having positive refractive power.

7. The zoom lens system of claim 6, wherein the second lens group comprises at least one aspheric surface.

8. The zoom lens system of claim 7, wherein a lens surface of the second lens group closest to the image is an aspheric surface.

9. The zoom lens system of claim 8, wherein a lens surface of the second lens group closest to the object is an aspheric surface.

10. The zoom lens system of claim 7, wherein a lens surface of the second lens group closest to the object is an aspheric surface.

11. The zoom lens system of claim 6, wherein the fifth and sixth lenses are formed as a cemented lens.

12. The zoom lens system of claim 5, wherein the second and third lenses are formed as a cemented lens.

13. An imaging apparatus comprising:
a zoom lens system of claim 1; and
an image pickup device for converting an optical image formed by the zoom lens system to an electric signal.

14. A zoom lens system comprising, in an order from an object to an image:
a first lens group having negative refractive power; and
a second lens group having positive refractive power,
wherein the zoom lens system satisfies conditions below:

$1.2 \leq F_{now} \leq 2.2$;

$2.5 < f_t/f_w < 3$; and $BFL \geq 6$ mm, wherein $F_{now}$ denotes an F-number at a wide angle position, $f_t$ and $f_w$ respectively denotes overall focal lengths at a telephoto position and a wide angle position, and BFL denotes a back focal length,
wherein the condition vd22<30 is satisfied, and
wherein vd22 denotes an Abbe number of a second lens from the object in the second lens group.

15. The zoom lens system of claim 14,
wherein a condition v(G2+)>50 is satisfied, and
wherein v(G2+) denotes an average of Abbe numbers of lenses having positive refractive power in the second lens group.

16. The zoom lens system of claim 15,
wherein a condition nd21>1.58 is satisfied, and
wherein nd21 denotes a d-line refractive index of the first lens from the object in the second lens group.

17. The zoom lens system of claim 14,
wherein a condition nd21>1.58 is satisfied, and
wherein nd21 denotes a d-line refractive index of the first lens from the object in the second lens group.

18. A zoom lens system comprising, in an order from an object to an image:
a first lens group having negative refractive power; and
a second lens group having positive refractive power,
wherein the zoom lens system satisfies conditions below:

$1.2 \leq F_{now} \leq 2.2$;

$2.5 < f_t/f_w \leq 3$; and $BFL \geq 6$ mm, wherein $F_{now}$ denotes an F-number at a wide angle position, $f_t$ and $f_w$ respectively denotes overall focal lengths at a telephoto position and a wide angle position, and BFL denotes a back focal length,
wherein a condition v(G2+)>50 is satisfied, and
wherein v(G2+) denotes an average of Abbe numbers of lenses having positive refractive power in the second lens group.

* * * * *